United States Patent
Axel et al.

(10) Patent No.: US 8,612,763 B1
(45) Date of Patent: Dec. 17, 2013

(54) DIGITAL SIGNATURE VERIFICATION PROCESSES, METHODS AND SYSTEMS

(75) Inventors: David J. Axel, Longwood, FL (US); Donald Kratt, Oviedo, FL (US); Dale Combs, Longwood, FL (US)

(73) Assignee: Assuresign, LLC, Altamonte Springs, FL (US)

( * ) Notice: Subject to any disclaimer, the term of this patent is extended or adjusted under 35 U.S.C. 154(b) by 1573 days.

(21) Appl. No.: 11/450,748

(22) Filed: Jun. 9, 2006

Related U.S. Application Data

(60) Provisional application No. 60/689,448, filed on Jun. 10, 2005.

(51) Int. Cl.
*H04L 29/06* (2006.01)

(52) U.S. Cl.
USPC .............................. 713/176; 380/30

(58) Field of Classification Search
USPC ......... 382/119, 187; 705/3; 348/781; 380/30; 713/176
See application file for complete search history.

(56) References Cited

U.S. PATENT DOCUMENTS

| | | | |
|---|---|---|---|
| 5,828,772 A | | 10/1998 | Kashi et al. ................ 382/119 |
| 6,148,093 A | * | 11/2000 | McConnell et al. .......... 382/119 |
| 6,307,955 B1 | * | 10/2001 | Zank et al. ................... 380/30 |
| 6,556,712 B1 | * | 4/2003 | Loudon et al. ............... 382/187 |
| 6,687,390 B2 | | 2/2004 | Avni et al. ..................... 382/119 |
| 2002/0049614 A1 | * | 4/2002 | Rice et al. ....................... 705/3 |
| 2003/0071850 A1 | * | 4/2003 | Geidl ............................. 345/781 |
| 2003/0103653 A1 | * | 6/2003 | Avni et al. ..................... 382/119 |
| 2005/0223234 A1 | | 10/2005 | McOwan et al. ............. 713/186 |

FOREIGN PATENT DOCUMENTS

EP    1174833 A2 *   1/2002    ............ G07F 19/00

OTHER PUBLICATIONS

Signature Link [online], Signature Link, Signature Software, Digital Signatures, Fraud Prevention, 1 page, [retrieved on Jun. 5, 2006] Retrieved from: http://web.archive.org/web/20050205024011/http://www.signaturelink.com/.

FIPS 186, Digital Signature Standard (DSS) May 19, 1994, [online], [retrieved on Jun. 5, 2006, 17 pages, Retrieved from: http://www.intl.nist.gov/fipspubs/fip186.htm.

\* cited by examiner

*Primary Examiner* — Jeffrey Pwu
*Assistant Examiner* — Thong Truong
(74) *Attorney, Agent, or Firm* — Ferdinand M Romano; Beusse Wolter Sanks Mora & Maire

(57) ABSTRACT

Methods, processes, systems and devices for allowing a computer user to sign and execute a document over the interne using a pointer device such as a mouse to generate a digital signature by an cursive signature (handwritten). The invention allows for vector points in the digital signature to be encoded/encrypted, stored and later be retrieved so that it can be verified where it came from, and what specific document it was on. If necessary, the invention allows for a newly executed signature to be forensically verified against a signature sample.

20 Claims, 5 Drawing Sheets

DIGITAL SIGNATURE VERIFICATION PROCESSES, METHODS AND SYSTEMS

This invention claims the benefit of priority to U.S. Provisional Application 60/689,448 filed Jun. 10, 2005.

FIELD OF USE

This invention relates to digital graphic signatures, in particular to methods, processes, systems and devices for allowing a computer user to sign and execute a document over the internet using a handwritten signature with a pointer device such as a mouse, allowing for the digital graphic signature to be later retrieved to verify where it came from, identify the document the signature was applied to, and, if necessary, allow for a new signature to be forensically verified against a signature sample.

BACKGROUND AND PRIOR ART

Digital signatures have been growing in popularity. With a computer user a computer mouse can be used as a pen to write a digitizable signature. Freeware programs enable computer users to create their signatures using the computer mouse. Computer generated graphic signatures are rapidly gaining acceptance for the execution of legally binding contracts.

Contracts can be signed using a mouse or another pointer device where the user moves the device in pen-like manner using either a JAVA programming language applet or an ActiveX component installed on a user's computer. At least two problems are associated with this approach.

Once the user finishes the digital signature, the JAVA program applet creates an image of the completed signature and stores it like a photo. The image is a does not allow for forensic examination of the digital signature. For example both, the spacing between the different curves of the signature becomes lost, and the exact sizing of each of the elements of the signature is lost. The precise location of curves of parts of the signature relative to other curves in the signature, and the size of the actual signature are lost.

The Windows operating system does not support JAVA unless the computer is specifically configured for JAVA. This means that most people using new Windows operating systems cannot use the JAVA system. Internet Explorer no longer comes with the JAVA Virtual Machine (JVM) installed on their newly purchased machines. Unless the user is technically savvy and able to install additional software, the user will be unable to use the current JAVA based application.

ActiveX component installation requires modification to the computer system registry and hence the user must have administrative privileges and skill in order to install it on a computer.

Both the JAVA programming applet and the ActiveX component are plug-ins that are downloaded to a user's computer. This renders the user's computer susceptible to from viruses and malicious code. Consequently, many corporate information technology organizations do not allow ActiveX controls to be downloaded and installed on corporate personal computers and have set browsers on the corporate computers to not run JAVA applets.

There is no encoding or serialization to associate the actual signature being checked with execution of a particular document. The current JAVA system does not distinguish if the signature being evaluated was executed on the correct document or a phony document. Clearly, neither fraud nor forgery can be detected using current systems.

Various systems have been proposed over the years for authenticating signatures. See for example, U.S. Published Patent Application 2005/0223234 to McOwan; U.S. Pat. No. 5,828,772 to Kashi; and U.S. Pat. No. 6,687,390 to Avni et al. None of the references known to the inventors solve all the problems of the prior art. For example, Avni '390 stores "position vectors" which are not used for the purposes of comparing the signature with a known sample to verify authenticity of a signature placed on a document. There is encoding and encrypting of any "position vectors" for verification of the documents.

Thus, the need exists for solutions to the above problems with the prior art.

SUMMARY OF THE INVENTION

A primary objective of the present invention is to provide methods, processes and systems for allowing a person to sign a document over the internet and worldwide web using a handwritten signature that can be executed with a pointer device such as a computer mouse.

A second objective of the present invention is to provide methods, processes and systems for allowing a person to sign a document over the internet and worldwide web using only standard browser capabilities on the user's computer.

A third objective of the present invention is to provide methods, process and systems for storing a digital cursive signature that can later be retrieved to verify where it came from, and confirm what specific document was executed.

A fourth objective of the present invention is to provide methods, processes and systems for storing a digital cursive signature that can be forensically verified against a signature sample.

A fifth objective of the present invention is to provide methods, process, and systems for encoding unique vector positions of a signature for signature verification on documents.

The invention allows for verification of signatures on documents where a computer user is using a mouse to write out a signature. The invention includes a validation process, a method and a system that makes sure and guarantees the signer is the person whose signature is on file.

A preferred method and process of storing digital graphic signatures for verification can include the steps of forming a handwritten signature with a computer pointing device, generating a plurality of vector points from the cursive signature over a time period, encoding/encrypting the vector points, and storing the generated vector points, wherein the vector points provide an identical replica of the cursive signature. The forming step can include using a computer mouse to form the cursive signature.

The method and process can also include appending a graphic watermark to the digital graphic signature, and creating an identification code from the digital graphic signature, wherein the digital graphic signature is linked to the signed document.

The method and process can also include retrieving the stored vector points, and recreating the original cursive signature from the stored vector points, as well as verifying a specific document for which the signature was formed.

The method and process can also include generating a first digital graphic signature from the stored vector points, and forensically verifying the newly generated digital graphic signature based on a second digital graphic signature.

A novel system for storing digital graphic signatures can include a source for forming a signature such as a computer pointing device, a generator for generating a plurality of vector points from the signature over a time period, an encoder/encrypter for encoding and encrypting the vector points, and storage for storing the generated vector points, wherein the vector points provide an identical replica of the signature. The source can be a computer mouse.

The system can further include an appender for appending a graphic watermark to the digital graphic signature, and a creator for creating an identification code from the digital graphic signature, wherein the digital graphic signature is linked to the signed document.

The system can further include a retriever for retrieving the stored vector points and a recreator for recreating the original cursive signature from the stored vector points.

The invention verifies whether a person created signature on document at a specific time at a specific place.

Further objects and advantages of this invention will be apparent from the following detailed description of the presently preferred embodiments that are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 5:
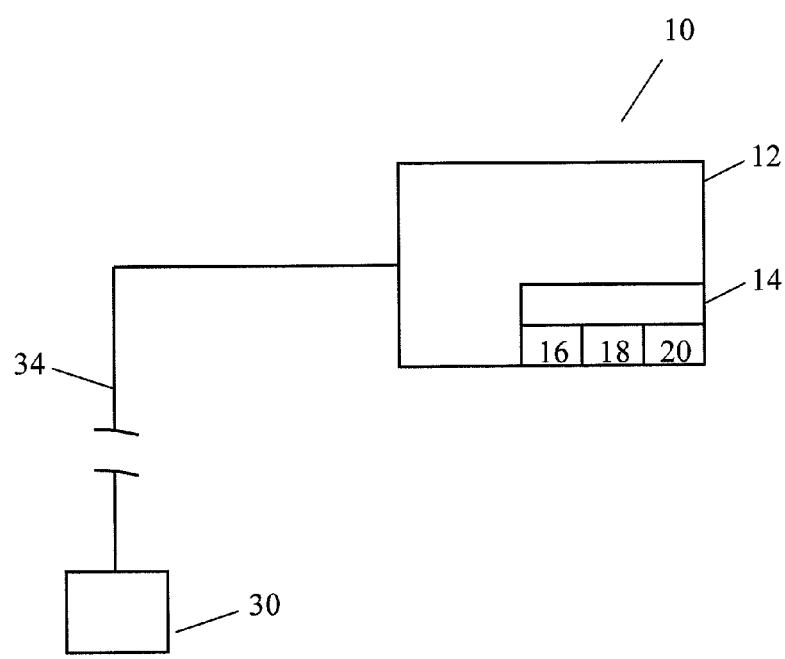
FIG. 5 illustrates a server-based system suitable for use in conjunction with methods according to the invention.

The novel invention can utilize a server-based JAVA script application to capture a customer's signature on a document, watermark the document, create a unique serial number relating the signature to the document, and encrypt and encode this information for storage. FIG. 5 illustrates a server system 10 suitable for use in conjunction with methods according to the invention. The server system 10 includes a computer 12 comprising storage 14 containing the following server-based applications which run on the system 10: a vector point generation application 16, an encoder 18, and an encrypter 20. When these applications are run on the computer 12, the system 10 creates, encodes and encrypts vector point positions descriptive of the signature, based on data that has been generated with a pointing device. Also shown in FIG. 5 are a customer/user personal computer 30 connected to access the server system 10 via the Internet 34. The computer 30 includes a computer pointing device (not shown).

Figure 1:
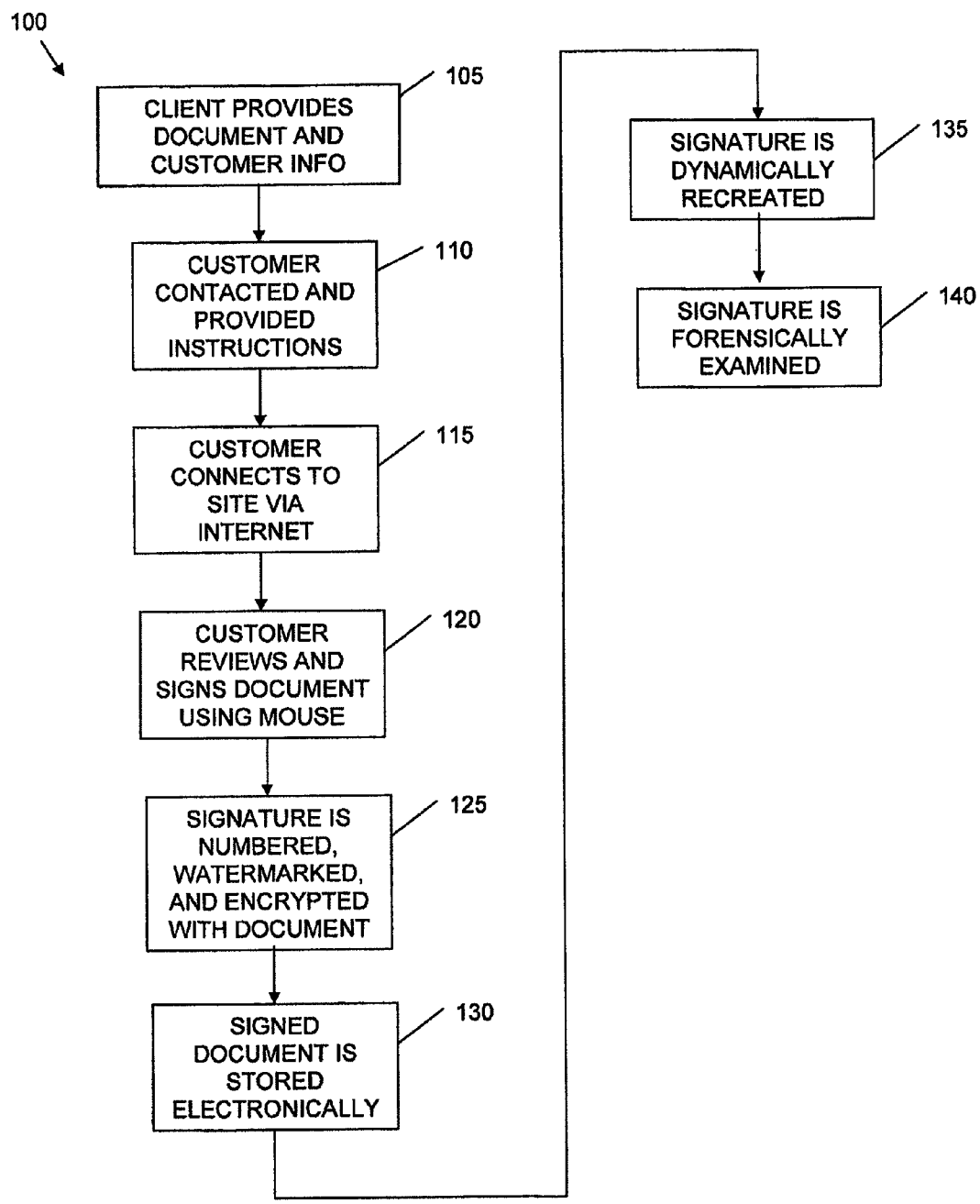
FIG. 1 describes a method steps according to the invention.

FIG. 1 provides an overview 100 of the novel invention. A client provides the document to be signed and contact information for the customer 105. The customer is contacted and given the information on how to access the novel system via a personal computer requiring no other software than a standard internet browser 110. The customer can connect to the novel system via the Internet 115. The customer reviews the document to be signed and proceeds to sign the document in a designated space on the document using the mouse or other pointing device on his computer 120. The mouse or pointing device can be used to simulate the action of a pen on a pad and capture the signature of the user.

After the customer has submitted his signature, the signature received a unique serial number or numbers, and watermarked. Then the serial number and watermark are encrypted together with the signature 125. The signed document with the encrypted signature is stored electronically by the novel system 130. In the event that the validity of the signature is questioned, the signature file is decrypted and the signature is dynamically recreated for matching with an original signature 135. The signature can be authenticated by existing forensic techniques 140. Such techniques can include but are not limited to common handwriting analysis where a human reviewer can visually compare individual letters and aspects of the signature (height of letters, spacing between letters, point where signature ends, and the like).

Figure 2:
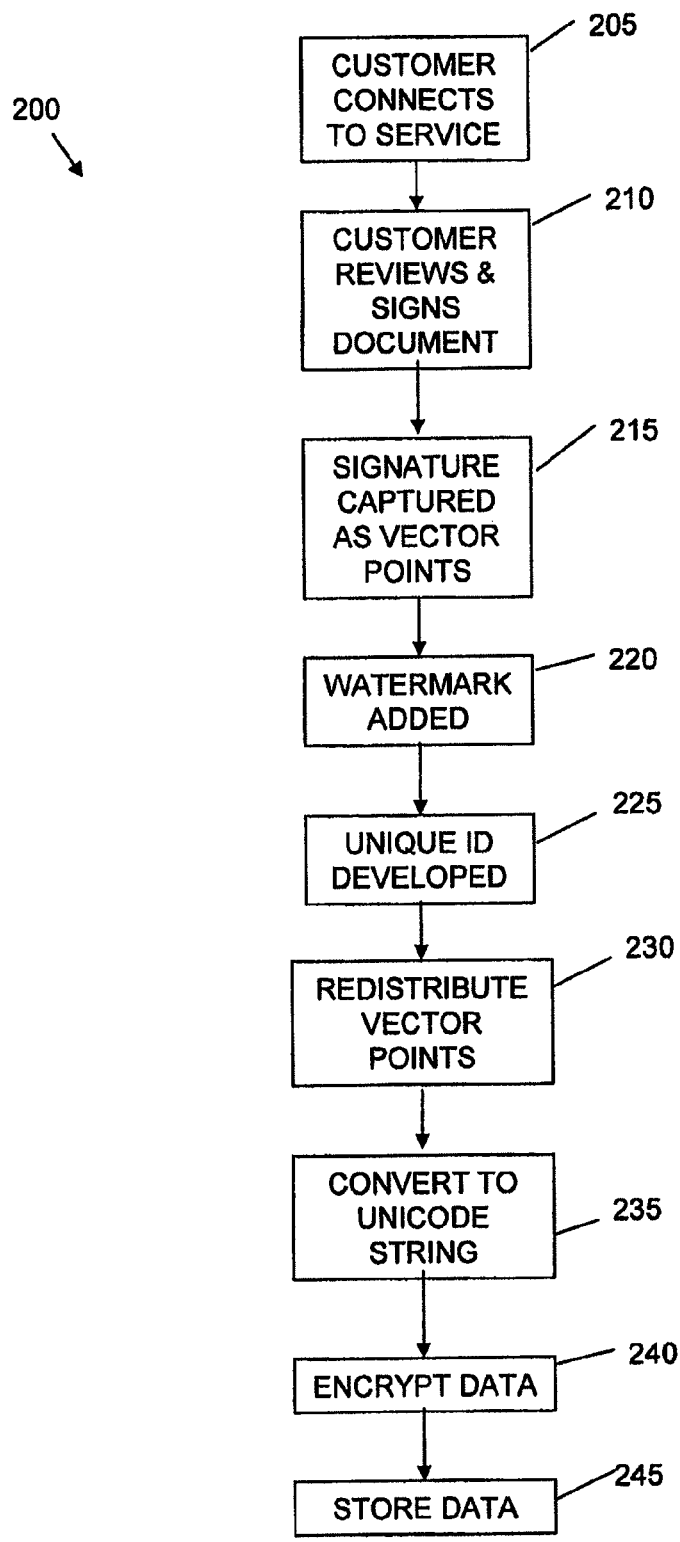
FIG. 2 illustrates a signature capture process.

The signature capture process 200 is shown in the block diagram of FIG. 2. A customer connects to the novel system, via the internet (world wide web), on a personal computer 205. The customer reviews the document to be signed and proceeds to sign his name in the space indicated by using the mouse or other pointing device of the personal computer 210. As the customer signs his name, the application software of the novel system captures the signature as vector points 215 that are compiled into a vector map.

The resulting vector map can be "3PVwatermarked" both visible on the computer display and internally when save 220. Watermarking comprises placing an artificial symbol behind the signature to verify where it came from, for example: the phrase "3PV" maybe placed behind the signature. The symbol, "3PV" shows that a particular company is associated with capturing the digital graphic signature on file.

In addition to watermarking, the signed document is assigned a unique identification number (ID) 225. Where this number is saved as part of the signature data and is not visible to the end users. The "3PV" watermark and the corresponding serial number displayed with the signature ensures that the signature is locked to the specific document signed by the customer. One could not "cut-and-paste" the signature onto another document as it would defy the locked mapping of the serial number to the document on file.

The vector points are redistributed 230, converted to a Unicode string containing header information 235, and encrypted to ensure that they can not be tampered with 240. Vector points are stored in a hexadecimal representation which assists in minimizing storage of a signature representation. The redistribution is applied so that no other party is able to take the data and recreate the signature. The redistribution redistributes the HEX (hexidecimal) values of the vectors using a pre-determined pattern whereby the individual HEX values of the vectors are shifted within the save field. For example, x, y coordinates are combined with other data, such as but not limited to date and time to create a unique document serial number.

Since the novel system runs as an ASP (Application Service Provider) model and no software is loaded onto the customer's computer, the signed document will be electronically stored 245 at a remote facility for any future requirement.

Figure 3:
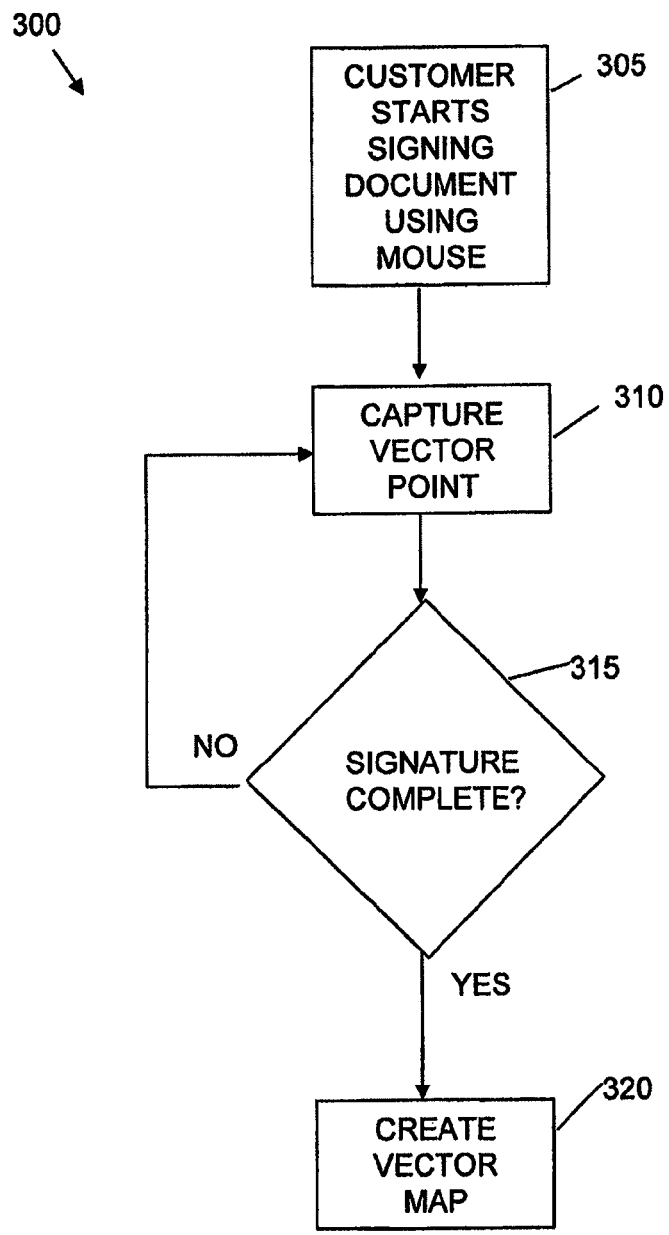
FIG. 3 illustrates a process for the creation of a signature vector map.

The creation of the signature vector map is schematically illustrated in FIG. 3. The customer begins by signing the document electronically using a mouse or other pointing device 305. The application software captures the vector points for every mouse-move 310 at timed intervals of approximately 25 milliseconds as the signature is being handwritten. Instead of storing a single photo image of a completed signature, the invention stores each recorded point, and the signature can be redrawn by connecting the points. After the signature is complete a vector map is created with the captured points in a set of x1, x2, y1, y2 coordinates 320.

Figure 4:
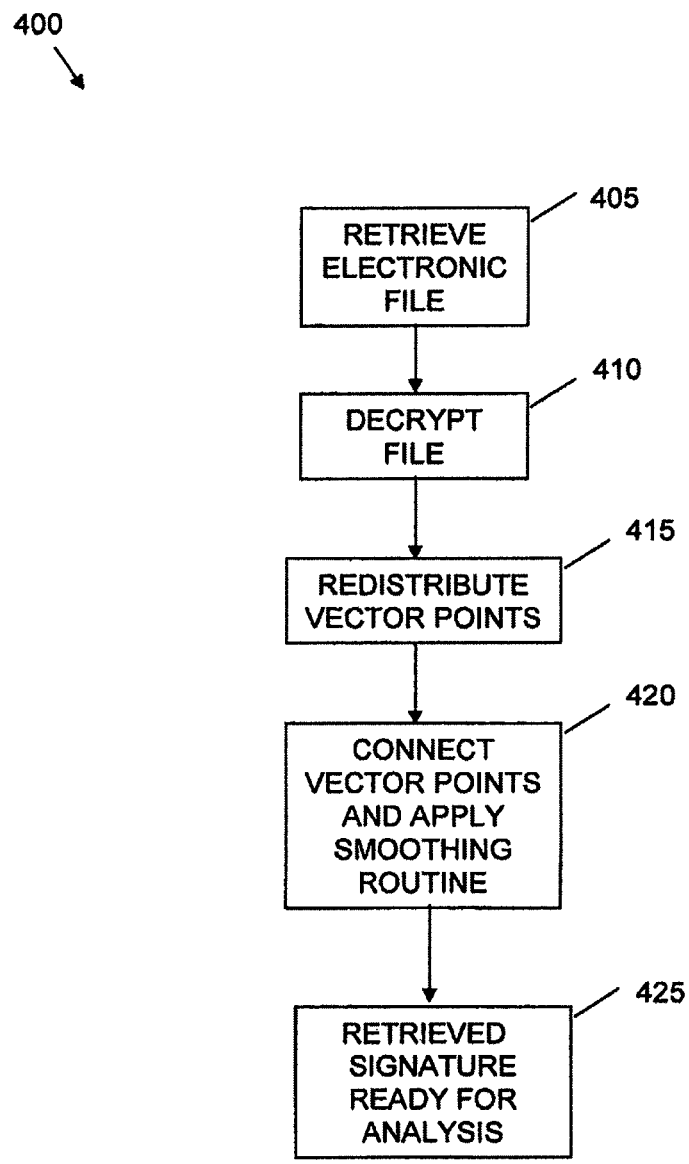
FIG. 4 describes an exemplary sequence of steps in the dynamic recreation of a signature.

FIG. 4 illustrates the process to recreate the customer's signature from the stored electronic file 400. After the file is retrieved 405, it is decrypted 410. The vector points are redistributed to match the original distribution of points 415. Then the vector points are connected and optimized (smoothed) based on a vector smoothing routine 420. The signature is then ready for comparison and analysis 425. Upon display it is possible to view the signature image with the watermark and with a unique "serial number" to identify the date and time, applicable content (eg., Contract Number, Order Number) and other information about the source of the signature to assure it has been processed and authenticated by the novel system.

The present invention provides benefits not available in the prior art. The application software resides only on the novel computer system and is accessed by users through a web browser such as Internet Explorer. No additional hardware or software is required.

The signature is watermarked, an identification code is produced that links the signature to the document being signed, and the information is then encrypted to provide security. The present invention provides for a paperless process and is UCC (Uniform Commercial Code) complaint.

While certain embodiments of the invention have been described, the scope of the invention is not limited thereby and such other modifications or embodiments as may be suggested by the teachings herein fall within the breadth and scope of the claims here appended.

We claim:

1. A method of storing a digital graphic signature comprising the steps of:
   (a) creating the digital graphic signature by a person forming a personal, handwritten stylized script signature of the person with a computer pointing device, the signature being of a type like that used by the same person to manually sign documents with a pen, wherein the process of forming the stylized script signature includes timeable movements similar to those present when manually signing a document with a pen;
   (b) creating a vector map of the signature by generating signature data comprising a series of vector points having vector point positions useful for analyzing authenticity of the signature, each position acquired at a determinable time in a time period during which the signature is formed; and
   (c) storing the vector points and time information with which a time associated with each position is determinable, wherein a combination of the vector points and time information enable provision of a replica of the handwritten stylized script signature and a replica of forming the handwritten stylized script signature,
   (d) generating both a replica of the handwritten stylized script signature and a dynamic re-creation of forming the handwritten stylized script signature, wherein the stored vector points and dynamic re-creation of forming the handwritten stylized script signature enable forensic analysis to authenticate the signature by matching the dynamic re-creation of forming the handwritten stylized script signature with another signature,
   (e) generating and appending a graphic watermark to a displayed image of the digital graphic signature, and
   (f) creating an identification code from the digital graphic signature, wherein the digital graphic signature is linked to a document signed with the handwritten signature.

2. The method of claim 1, wherein the forming step includes using a pointing device other than a computer mouse to form the signature and the forming step consists only of creating a handwritten stylized script.

3. The method of claim 1, further comprising the step of forensically verifying the first digital graphic signature against another signature.

4. The method of claim 1, wherein the step of forming the signature is an execution of a document with the signature being the name of the person, the method further comprising the steps of:
   encrypting the vector points;
   de-encrypting the encrypted vector points; and
   verifying a specific document for which the handwritten signature was formed.

5. The method of claim 1, further comprising the steps of:
   (a) generating a first digital graphic signature from the stored vector points; and
   (b) forensically verifying the newly generated digital graphic signature against a second digital graphic signature.

6. The method of claim 1 wherein the vector point data are acquired at uniform time intervals.

7. The method of claim 6 wherein the vector point positions are acquired at uniform time intervals of 25 milliseconds as the signature is being formed.

8. The method of claim 1 wherein the vector point positions are acquired at uniform time intervals as the signature is being formed.

9. The method of claim 1 wherein each in a plurality of the vector point positions is associated with a different time in the time period during which the signature is formed.

10. The method of claim 1 further including encoding the vector points before storing the vector points.

11. The method of claim 1 wherein the step of forming the signature consists only of creating a handwritten stylized script.

12. The method of claim 11 including:
    assigning a unique number to the vector map and an identification number to the document; and
    mapping the unique number assigned to the vector map to the identification number.

13. The method of claim 12 further including storing the document identification number together with the signature data.

14. The method of claim 13 wherein the step of appending a graphic watermark includes watermarking the signature so that the combination of a watermark and the unique number assigned to the vector map lock the vector map to the document for identification and authentication.

15. The method of claim 11 further including:
    assigning a unique number to the vector map as a representation of the signature; and
    displaying the unique number with the signature.

16. The method of claim 1 wherein the vector points are redistributed, converted to a Unicode string containing header information and encrypted.

17. A system for storing a digital signature and associating the signature with a document, comprising:
    a computer system accessible to users through a web browser to capture a user's original personal, handwritten stylized script signature being input by the user through a computer pointing device remote from the system, the computer system including:
    a server-based application which uses data generated with the pointing device as the signature is formed to create a series of vector point positions descriptive of the personal, handwritten stylized script signature and containing information useful for analyzing authenticity of the signature, wherein the application controls acquisition of each point position at a time interval relative to a portion of a time period during which the signature is formed, the digital signature comprising the point positions as a function of the time intervals;

an encoder for encoding the generated vector point positions; and a storage medium for storing the vector point positions, wherein the vector points provide an identical replica of the signature, and wherein the server-based application dynamically recreates the original personal, handwritten stylized script signature in accord with the predetermined time intervals from the stored vector points wherein the server-based application (a) generates and appends a graphic watermark to a displayed image of the digital graphic signature, and (b) creates an identification code from the digital graphic signature linking the digital graphic signature to a document signed with the handwritten signature.

18. The system of claim 17, wherein the signature is a cursive signature.

19. The system of claim 17, wherein the server-based application verifies a specific document based on whether the handwritten stylized script signature matches another signature.

20. The system of claim 17, wherein the server-based application forensically verifies the first digital graphic signature against a second digital graphic signature based on comparison and analysis of vector points as a function of time intervals.

\* \* \* \* \*